United States Patent [19]

Daimler

[11] Patent Number: 4,995,304
[45] Date of Patent: Feb. 26, 1991

[54] EXTENDABLE CYLINDERS OF ELASTICALLY VARIABLE LENGTH FOR USE IN A PUMP

[75] Inventor: Berthold Daimler, Remscheid, Fed. Rep. of Germany

[73] Assignee: Firma Carl Freudenberg, Weinheim, Fed. Rep. of Germany

[21] Appl. No.: 117,048

[22] Filed: Dec. 28, 1987

Related U.S. Application Data

[62] Division of Ser. No. 804,155, Dec. 3, 1985, abandoned.

[30] Foreign Application Priority Data

Dec. 10, 1984 [DE] Fed. Rep. of Germany ....... 3444978
Jul. 3, 1985 [DE] Fed. Rep. of Germany ....... 3523717

[51] Int. Cl.$^5$ .............................................. F01B 19/04
[52] U.S. Cl. ........................................ 92/92; 417/375; 417/439
[58] Field of Search .................... 417/375, 439, 401; 92/34, 38, 39, 42, 47, 89, 90, 91, 92

[56] References Cited

U.S. PATENT DOCUMENTS

| 2,464,095 | 3/1949 | Nies | 417/375 |
| 3,492,946 | 2/1970 | Martin | 417/401 X |
| 3,945,770 | 3/1976 | Welker | 92/90 X |
| 4,525,127 | 6/1985 | Welker | 92/90 X |
| 4,769,992 | 9/1988 | Harada et al. | 92/38 X |

FOREIGN PATENT DOCUMENTS

| 1317932 | 1/1962 | France | 417/375 |
| 56-86208 | 7/1981 | Japan | 92/90 |

Primary Examiner—Robert E. Garrett
Assistant Examiner—Mark A. Williamson
Attorney, Agent, or Firm—Felfe & Lynch

[57] ABSTRACT

An extendable cylinder of elastically variable length and substantially invariable circular cross section is combined with another such extendable cylinder or a movable separating organ to form an operating unit. One of the extendable cylinders of the operating unit is arranged for two or three dimensional motion of a free one end as it extends. For example, symmetric, concentric elastic cylinders between common plates at opposite ends of the cylinders extend together two dimensionally.

14 Claims, 7 Drawing Sheets

EXTENDABLE CYLINDERS OF ELASTICALLY VARIABLE LENGTH FOR USE IN A PUMP

CROSS REFERENCE TO RELATED APPLICATION

This application is a division of application Ser. No. 804,155 filed Dec. 3, 1985 now abandoned for "Extendable Cylinders of Elastically Variable Length".

The invention relates to extendable cylinders of elastically variable length and substantially invariable circular cross section.

Using the subject matter of published German patent applications DOS No. 31 10 153 and DOS No. 31 32 906 as the point of departure, the invention seeks to provide novel and advantageous improvements to the axially elastic extendable cylinder. Its object thus is to develop potential uses particularly in the conversion of energy, in the leakless conveying of fluidizable materials, and in the execution of two- or three-dimensional sequences of motion, etc.

This object is accomplished through extendable cylinders of the type outlined above, the invention consisting in an extendable cylinder being combined with further extendable cylinders and/or other movable separating organs to form an operating unit, and in means or arrangements being operatively associated with individual extendable cylinders or with all extendable cylinders of the operating unit whereby two- or three-dimensional motions of the free cylinder ends can be executed as extension proceeds.

A sizable number of advantageous embodiments and refinements of the invention is defined in the claims. In addition, the invention will now be described in greater detail with reference to the accompanying drawings, wherein:

Figure 1:
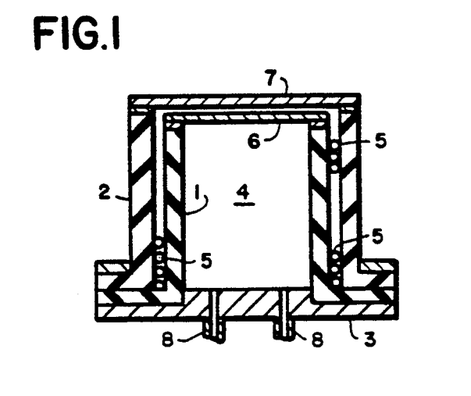
FIG. 1 shows two nested extendable cylinders with armor between the cylinder walls, FIGS. 2 and 3 a double cylinder, FIG. 4 twin cylinders, FIG. 5 a pump design with two extendable cylinders, FIG. 6 an extendable-cylinder pump with straightforward flow.

Shown in FIG. 1 are two coaxial and radially-spaced, i.e., nested, inner and outer, extendable cylinders 1 and 2, respectively, of differing diameters for the nesting and mounted by their lower ends on a common base plate 3. The radial space between the two cylinders 1 and 2 is such that a set of rings 5 of round bar steel can be accommodated therein as intermediate armor. Upper end covers 6 and 7 of the respective cylinders are in contact with each other. The interior 4 of the inner cylinder 1 is provided with pipe connections 8 and may serve as an accumulator, a pulsation damper, etc. With axial extension, the wall thickness of both cylinders decreases. While the inside diameter of the inner cylinder 1 then increases, the inside diameter of the outer cylinder 2 remains unchanged since there is no internal pressure and the outer cylinder bears on the armor 5 because of the necking down due to the longitudinal extension. The thinner the wall of the inner cylinder 1 is by comparison with that of the outer cylinder 2, the less its inside diameter increases upon extension and the higher the filling pressures that can be achieved with the same extension of the arrangement. This arrangement therefore is suited particularly for high operating pressures. However, the wall of the inner cylinder 1 must have a certain minimal thickness that is determined by the properties of the elastomer and by the design of the armoring elements (rings, winding, material of construction).

Figure 16:
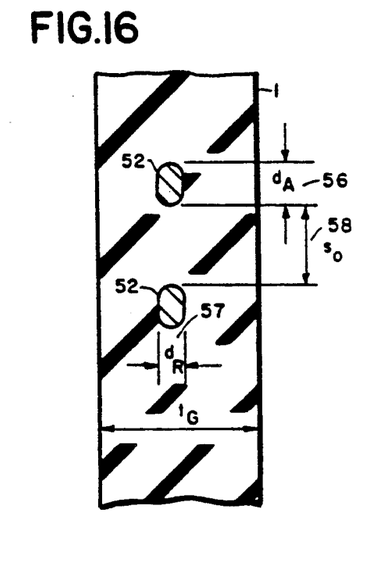
FIG. 16 the dimensioning of the armor in the elastomer wall.

Since the armor will generally not be discussed in detail in connection with the description of the embodiments of the invention, a few explanations concerning it will be in order at this point. Extendable cylinders of the axially elastic type are protected against a change in cross section by entrained armoring elements of low elasticity which are oriented in the circumferential direction. Such armoring elements are of two types: Tension armor, which is effective against internal superatmospheric pressure, and compression armor, effective against external superatmospheric pressure. Compression armor also serves to limit necking down of the extendable cylinder when the latter is stretched by external forces. A combination of tension and compression armor is effective against alternating internal and external superatmospheric pressure. The same effect can be achieved by means of so-called rigid armor, that is, armor made of a material having high tensile and flexural strength or shear resistance that is embedded in the elastomeric wall. Rules for the dimensioning thereof are given, as part of the invention, in connection with FIG. 16.

Figure 2:
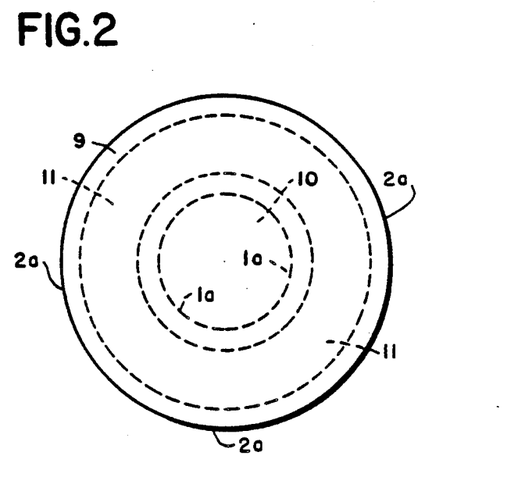
Figure 2A:
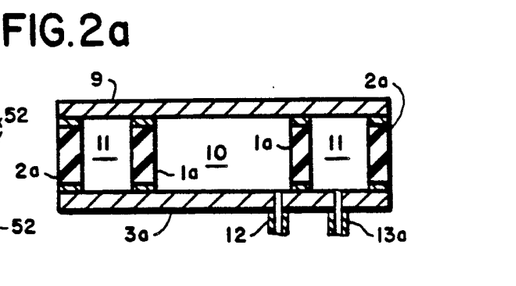

FIG. 2 shows, two concentric extendable cylinders 1a and 2a which are united by common end plates 3a and 9. The two respective interiors 10 and 11 of the cylinders 1a, 2a are provided with intakes 12 and 13, respectively. When one of the cylinders extends by filling therethrough under pressure, the other cylinder necessarily also extends, and the arrangement may therefore be used as a pump or as a pressure increasing or reducing device.

Figure 3:
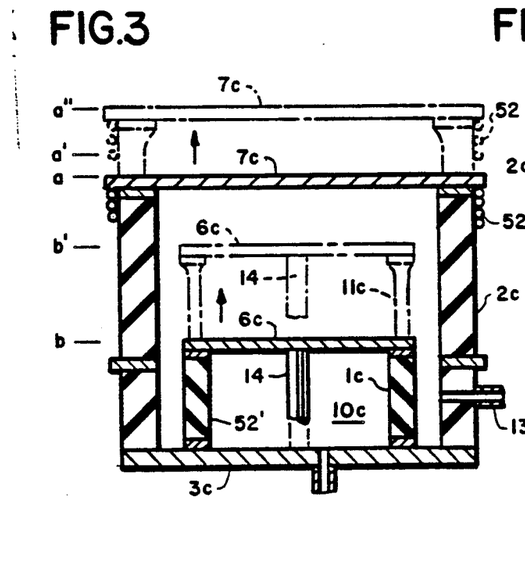

FIG. 3 shows an arrangement with two coaxial extendable cylinders 1c, 2c similar to those of FIGS. 1 and 2. When the outer cylinder 2c is pressurized with a fluid (gas or liquid), it extends, with its cover 7c lifting from position a to position a', for example. The superatmospheric pressure in its interior space 11c at first acts also on the other, inner extendable cylinder 1c as an external pressure. When the inner extendable cylinder 1c is thereafter filled with a pressure medium or caused by means of a rod 14 to extend from b to b', this results in a further extension of the outer cylinder from a' to a", transmitted by the fluid confined therein. The filling pressure and compressibility of the latter determine, in addition to the spring rates of the two extendable cylinders, the overall characteristics of the arrangement of FIG. 3 as an accumulator or spring which thus is adjustable in operation.

Extendable cylinders associated in pairs may be designed as pumping mechanisms, with the two cylinders acting in tandem. This will require an external drive, or with one cylinder functioning as the drive and the other as the pump. A few embodiments are shown in FIGS. 4 to 6.

Figure 4:
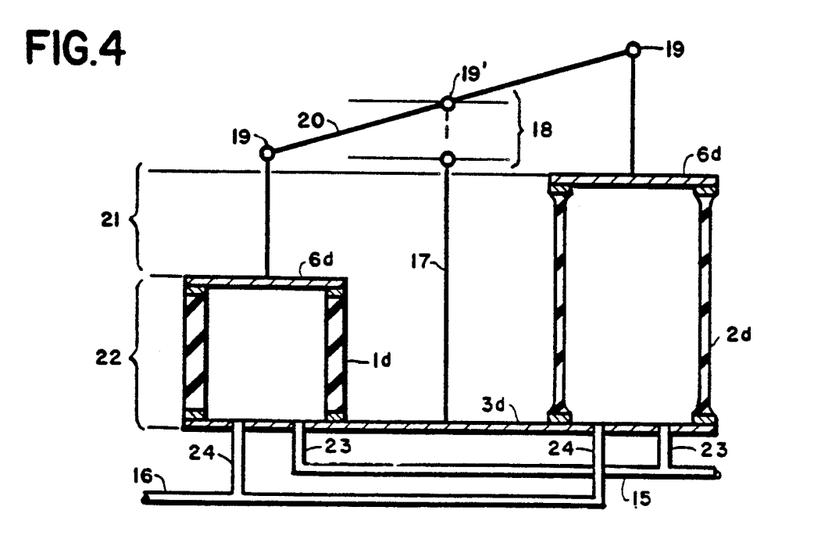

In FIG. 4, two extendable cylinders 1d, 2d spacedly mounted side by side on a base plate 3d are individually connected to a pressure line 15 and to a suction line 16, preferably by way of check valves 23, 24, respectively. Their covers 6d are attached by hinges 19 to a rocker bar 20 pivotally supported centrally by a hinge 19'. When the bar pivot 19 is raised by the extendable length 18 by means of the support 17, then, assuming equal dimensioning, both cylinders are extended or preloaded by the amount 18. The total stroke 21 of each of the cylinders then is 2×18. Their unextended length is designated 22. The pump is actuated by the rocking motion of the bar 20 on its pivot 19. The two cylinders 1 and 2 need not be of the same size but may have different sizes and strokes with appropriate modification of the rocking drive. However, when the pressure and suction lines are reversed and stroke-dependent control of the valves is adopted, the arrangement shown in FIG. 4 can also serve as a pneumatic or hydraulic two-piston motor.

Figure 5:
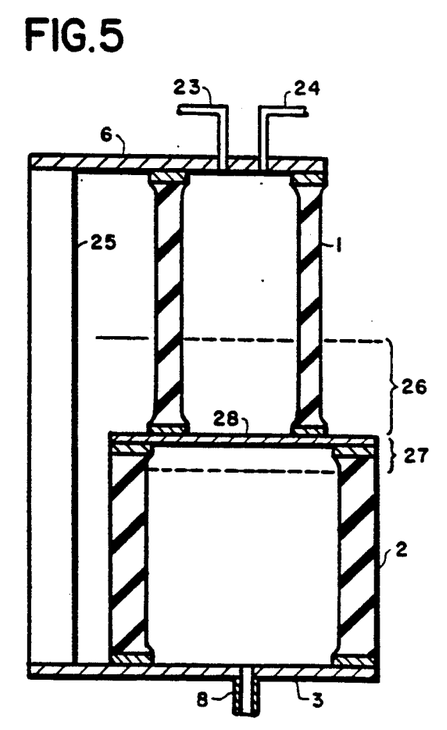

In FIG. 5, two dissimilar extendable accumulators 1 and 2 are disposed one above the other and united by a common connecting plate 28. Their covers 3 and 6, extended on one side, are attached to the ends of a crossbar 25 in such a way that the two extendable cylinders preload each other. The preloading stroke of cylinder 1 is greater than that of cylinder 2, as indicated by 26 and 27. A pressure medium is alternately admitted to and withdrawn from the lower cylinder 2 through the intake pipe 8. The permissible stroke is equal to the amount of the preloading stroke 26 and is at the same time the pumping stroke of pump cylinder 1.

Figure 6:
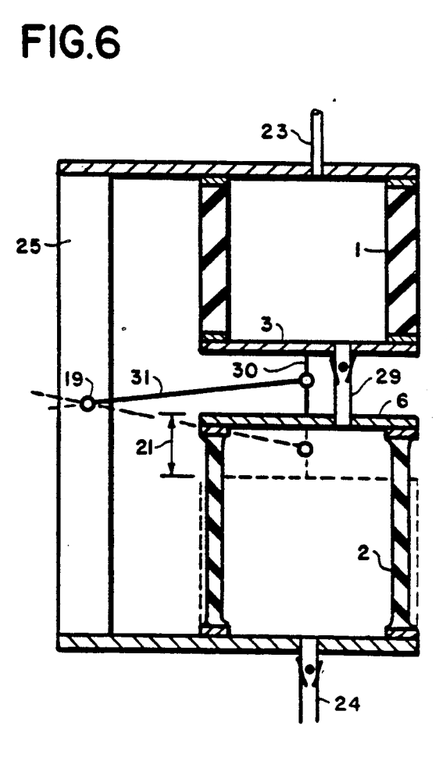

Shown in FIG. 6 is a pump of similar design, except that the medium being pumped flows through both extendable cylinders 1 and 2 without a reversal of direction. The facing covers 3 and 6 are coupled together by a rod 30 and adapted to be moved up and down together by means of a lever 31 which turns on a pivot 19 disposed on the crossbar 25. The lower extendable accumulator 2 is provided with a suction pipe connection 24 incorporating a check valve and serves as a pump chamber. The connecting pipe 29 leading to the upper extendable cylinder 1 is also provided with a check valve and serves as a pressure pipe. The interior of the upper cylinder 1 serves as an equalizing space for the medium flowing through it.

Because of the nature of the coupling of motion, the axial motions shown in FIGS. 4 and 6 of the extendable cylinders 1 and 2 follow a two-dimensionally curved path rather than a rectilinear one.

Figure 7:
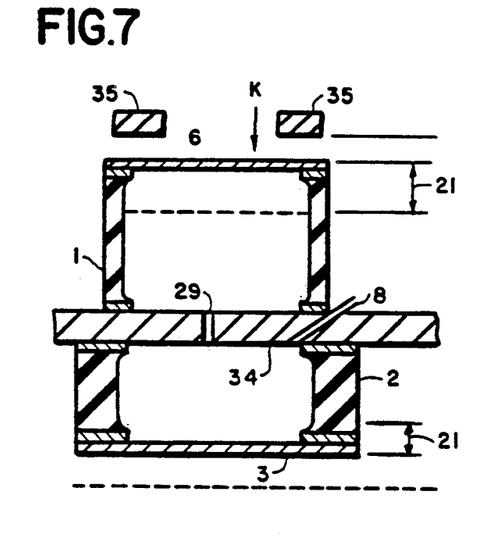
FIG. 7 a dashpot.

FIG. 7 shows an extendable-cylinder design for a dashpot or spring element. An extendable cylinder 1 of light construction is disposed above a base plate 34, and below it an extendable cylinder 2 of heavier construction. These cylinders are interconnected through a port 29. A pipe connection 8 permits the two cylinders to be pressurized when necessary. The upper cylinder 1 then executes a preloading stroke 21, which is available for spring recoil, under the impact of forces K acting from above, with respect to the plate 34. The resilience of the spring is provided by the lower extendable accumulator 2. Bounce-back can be limited by means of stops 35 for the end cover 6 of the extendable accumulator 1.

Figure 8A:
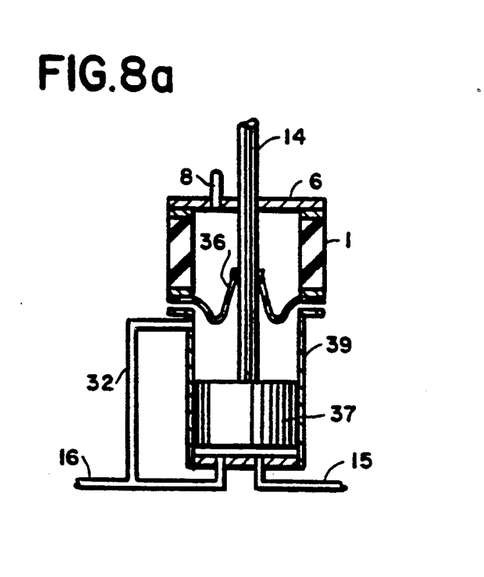
FIG. 8 an extendable cylinder with a plunger pump.
Figure 8B:
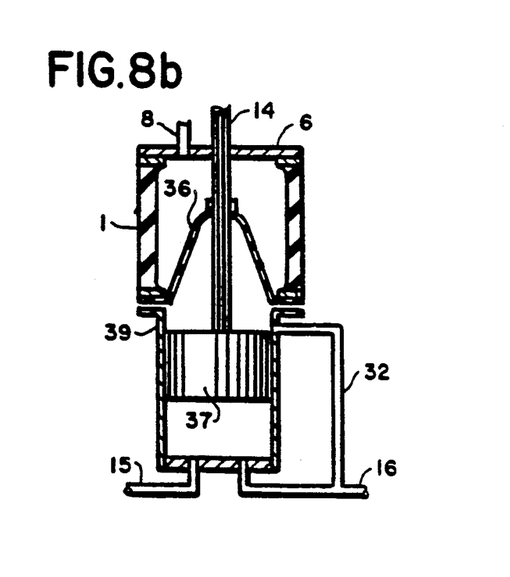

FIG. 8 illustrates the combination of a plunger pump with an extendable cylinder and a diaphragm to form a completely leakless metering pump. The diaphragm 36 is sealingly attached to the rod 14 of the plunger 37 and separates two liquids which are under the same pressure, namely, the medium to be pumped, which enters through the exchange line 32 or the annular gap between the plunger 37 and the cylinder 39, and a transmission liquid that is inert to the elastomer and is introduced through a pipe stub 8.

Figure 9:
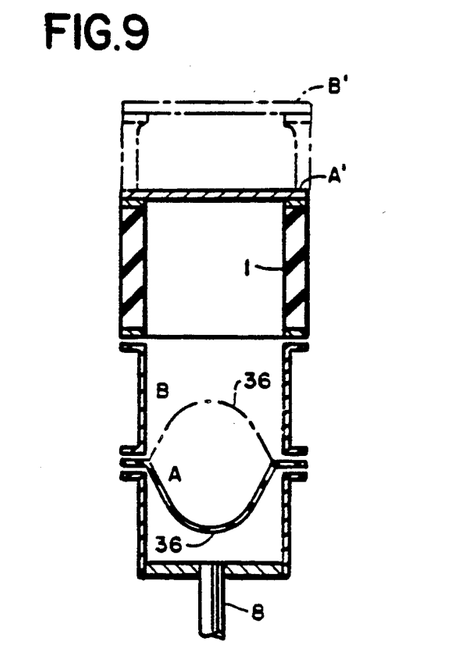
FIG. 9 an extendable-cylinder pulsation damper with separating diaphragm.
Figure 10:
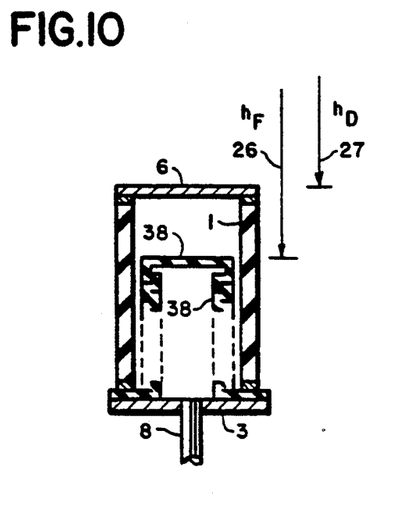
FIG. 10 an extendable cylinder with bellows.
Figure 10A:
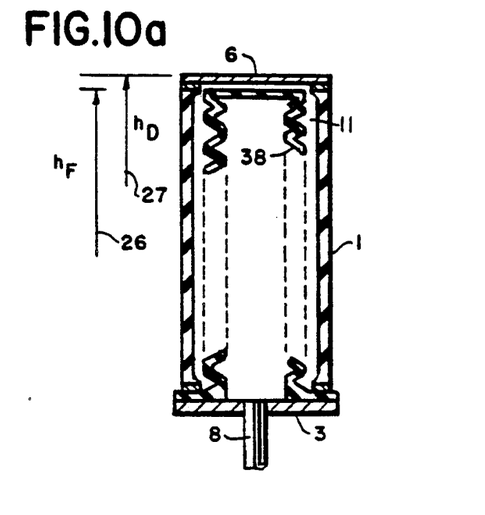

Shown in FIGS. 9 and 10 are two accumulators, preferably for the dampening of pulsations. The pressure-storage function is assumed in each case by an extendable cylinder 1. To shield the latter from the possibly aggressive medium from the intake 8, a diaphragm 36 operated without pressure serves in FIG. 9 as an isolating organ. The empty and full positions of the accumulator are designated A and B or A' and B', respectively.

In the embodiment shown in FIG. 10 (a) and (b), a bellows, folding cylinder or corrugated cylinder 38 is used in place of a diaphragm. The cover of the bellows may be firmly secured to the end cover 6 of the extendable cylinder 1. However, if the bellows is to be operated without pressure, the annular space 11 between the bellows 38 and the extendable cylinder will have to be filled with a transmission liquid, as indicated. Because of the smaller effective cross-sectional area of the bellows, its stroke 26 is greater than the stroke 27 of the extendable cylinder 1.

Figure 11:
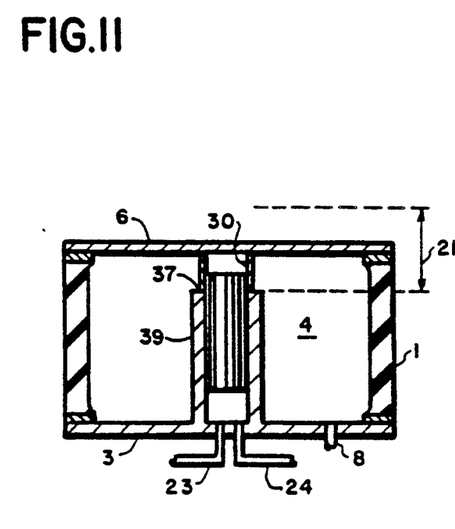
FIG. 11 a multipurpose extendable-cylinder pump with plunger and cylinder.

FIG. 11 shows a pump where a plunger 37 is rigidly attached by means of coupling rods 30 to the cover 6 of an extendable cylinder 1 of large diameter. The cylinder/plunger unit 37 and 39 is operated in that the interior 4 of the extendable cylinder 1 is expanded with compressed air admitted through the intake 8 and then again contracts when the pressure is relieved. With suitable modification of the pipe connections, the plunger may also be used as a hydraulic drive and the extendable cylinder as a pump chamber. The pressure-increase ratio with a particular mode of operation is obtained from the ratio of the cross-sectional areas of plunger 37 and cylinder 1.

Figure 12:
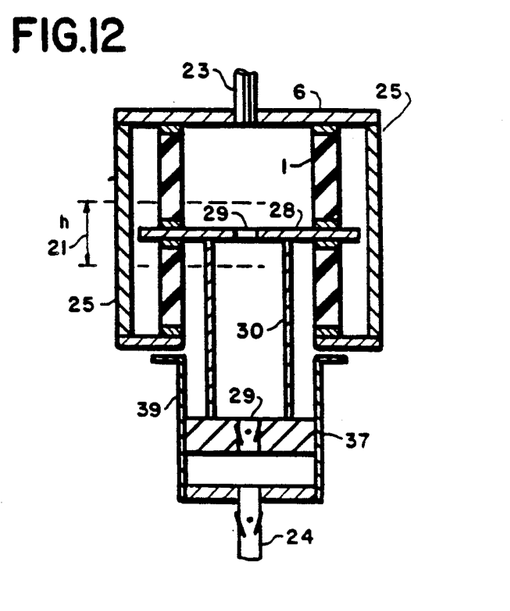
FIG. 12 a pump design with two extendable cylinders and plungers.

The pump arrangement shown in FIG. 12 embodies inventive characteristics from FIGS. 6 and 8. It represents a hermetic plunger pump through which the medium flows without reversing direction. To be able to execute the pumping stroke 21, it is necessary to impart an alternating motion to the connecting plate 28 by means of a drive acting from outside.

Figure 13:
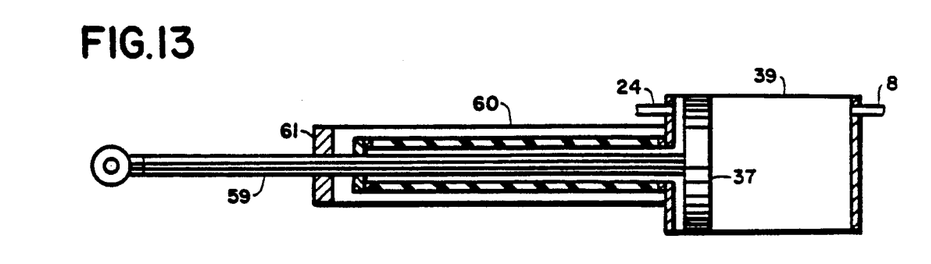
FIG. 13 a cylinder/piston unit with an extendable-cylinder seal.
Figure 14:
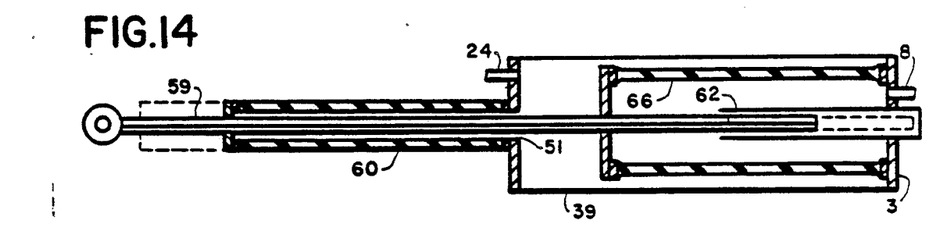
FIG. 14 a double-acting extendable-cylinder unit.

FIGS. 13 and 14 show embodiments of a pneumatic or hydraulic working cylinder. In FIG. 13, a piston 37 moves in a cylinder 39 provided with two pipe connections 8 and 24. The piston rod 59 is guided through a collar 61 by means of a nonsealing sleeve bearing. An extendable cylinder 60 of small cross-sectional area provides outward sealing in that it is secured to both the piston rod 59 and the cover of the cylinder 39 on the piston-rod side. FIG. 13 shows the sealing cylinder 60, which moves like the piston 37, in the position of maximum extension.

The embodiment shown in FIG. 14 also has two pressure chambers with pipe connections 8 and 24 for the pressure-dependent movement of the piston rod 59. In place of a piston 37, however, it comprises an extendable cylinder 66 that has a considerably larger diameter than the extendable sealing cylinder 60 and is accommodated in the rigid cylinder 39. One of the end covers of the drive cylinder 66 coincides with the end cover 3 of cylinder 39 that is remote from the piston rod while its other cover, through whose center the piston rod 59 passes, is sealingly secured thereto. Cylinder 39 has in one of its end covers a sleeve bearing 51 and in its opposite end cover a guide bushing 62 for the piston rod 59.

Figure 15:
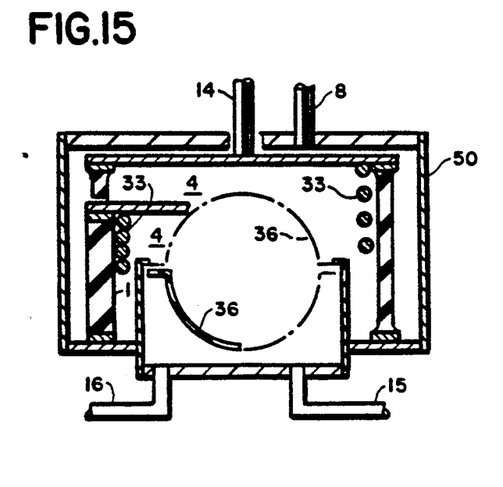
FIG. 15 an extendable-cylinder diaphragm pump.

The pump shown in FIG. 15 also represents a combination of an extendable cylinder and a rigid pressure chamber. The extendable cylinder 1, preloaded by a helical spring 33, is driven by pulsating superatmospheric pressure in a tank 50 provided with an intake connection 8. The resulting pumping action in the interior 4 of the extendable cylinder 1 is transmitted by a diaphragm 36, again operated without pressure, to the medium being pumped. Alternatively, the extendable cylinder 1 may be driven mechanically by means of a rod 14. In that case, the preloading spring 33 and the outer housing 50 can be dispensed with for simplification. However, with this arrangement the embodiment shown in FIG. 15 can also be operated as a hydraulic motor. A reciprocating motion is then imparted to the extendable cylinder 1 by the rhythmically alternating pressure of a hydraulic fluid, admitted and withdrawn through pipe connections 15 and 16, respectively, with the cylinder then transmitting its axial motion to the rod 14, which may drive a crank. Here, too, the function of the diaphragm 36 is to prevent the hydraulic fluid, for example, oil, from coming into contact with the elastomeric material of construction of the extendable cylinder 1.

It has been found that certain geometric relationships must be observed if premature damage to an elastomer having armor embedded therein is to be avoided. These relationships will now be described with reference to FIG. 16, which shows a section of a wall of an extendable cylinder 1. Assume that the thickness of the unloaded rubber wall is $t_G$, the diameter of the armoring elements, measured in the radial direction, $d_R$ (57), and their axially measured diameter, $d_A$ (56). Let the axial spacing of the armoring elements 52 be $s_o$ (58). The ratio $t_G:d_R$ is advantageously greater than from 2 to 3, and the ratio $s_o:d_A$ should be greater than 1 and preferably is greater than 2. Moreover, arrangements where $t_G:d_R \times s_o:d_A$ is greater than 3 are preferred.

Figure 17:
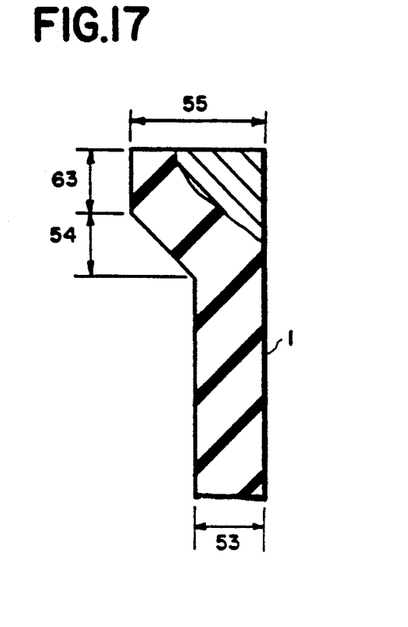
FIG. 17 the design and attachment of the cylinder ends.

FIG. 17 gives suggested dimensions for the joining of cylinder-body ends and end covers, made of a metal or plastic of appropriate strength. The wall thickness of the extendable cylinder 1 is designated 53. The dimension 54 advantageously is approximately the same as 53, and the dimension 55 about twice as large. When the flange formed is to consist entirely of an elastomer and is to be held by a clamping ring, it will be advantageous from the standpoint of safe absorption of the forces of extension if the dimension 63 is also made approximately the same as 53. When in place of or in addition to clamping a vulcanized joint is used, for example, with a ring of width 55, then its thickness 63 may, in keeping with the static requirements, also be smaller than the dimension 53. It may be advisable to direct one flange outwardly and the opposite flange into the interior of the extendable hose.

Figure 18:
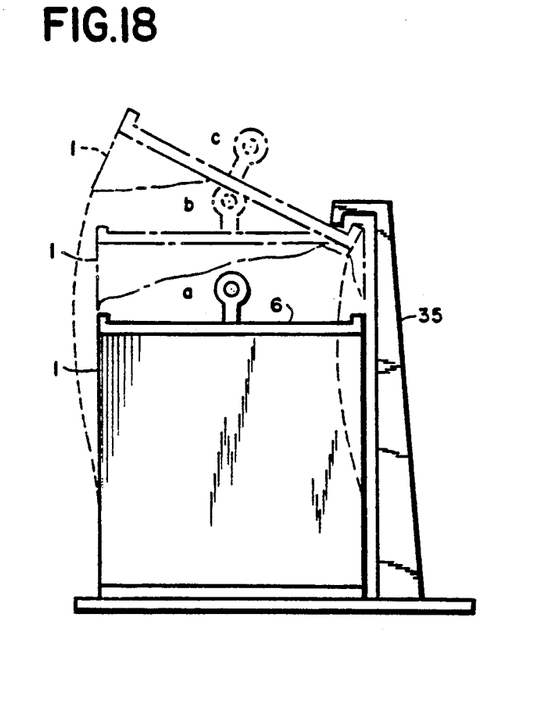
FIG. 18 an extendable cylinder with a stop for curved guidance.

Shown in FIGS. 18 to 23 are arrangements for the execution of multidimensional motions by extendable cylinders. FIG. 18 shows an extendable cylinder 1 with a cover 6 to which a bar with a connecting eyelet is attached. A stop 35 is located so that after an initially straight extension of the extendable cylinder 1 the cover 6 of the latter strikes the stop, which then prevents further extension of the cylinder on that side. With a further pressure increase in the extendable cylinder 1, the cover 6 will incline sideways. The various positions of the eyelet are marked a, b and c.

Figure 19:
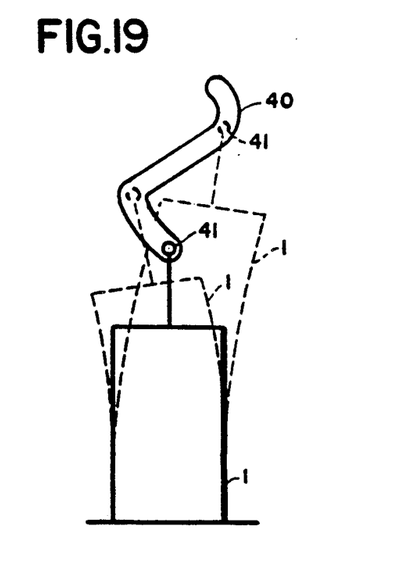
FIG. 19 an extendable cylinder with a guide rail.

In FIG. 19, the extendable cylinder 1 is connected to a guide rail or cam through guide members 41 in such a way that the movement of the free cylinder end follows the guide rail 40.

Figure 20:
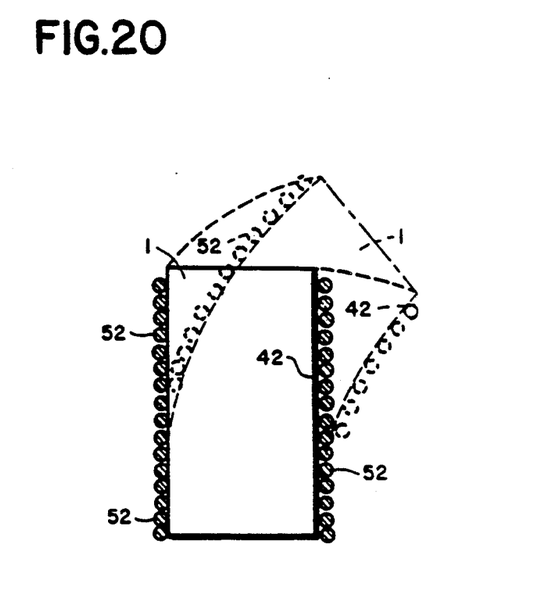
FIG. 20 an extendable cylinder with a tensioning element.

Shown in FIG. 20 is an extendable cylinder having axial elasticity which upon an increase in filling pressure simultaneously extends and curves sideways. This is brought about by placing between the surface of the extendable cylinder 1 and its outer armor 52 a tensioning element 42 which links the two end covers of the cylinder. The sequence of motions of the cylinder end can be modified or controlled over a wide range by appropriate placement of the tensioning element or of a combination of auxiliary tensioning means.

Figure 21:
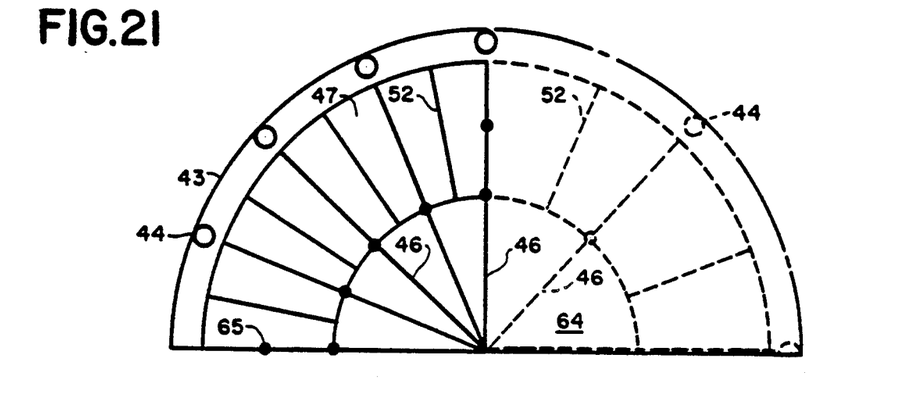
FIG. 21 an extendable cylinder with spokes, rollers and guide rails.
Figure 21A:
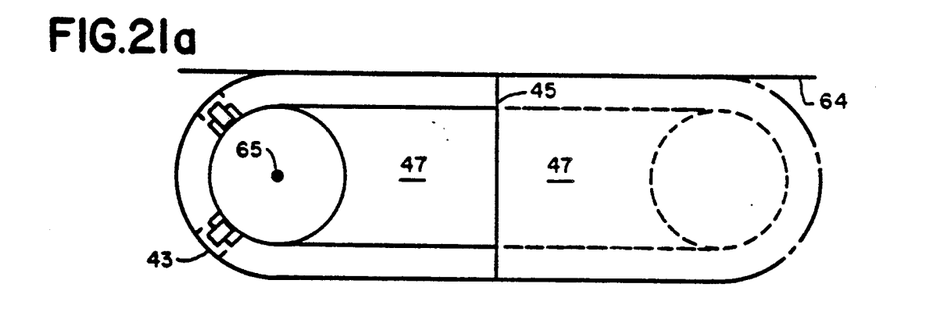

FIG. 21 shows possible embodiments for obtaining a circular motion of the free cylinder end. This results in hermetic, self-resetting pivot drives for pneumatic and hydraulic systems. For example, the extendable body 47 may be mounted on a base plate 64 wherein a pivot or pivot bearing 45 is provided at some distance from the center 65 of the surface area of the extendable cylinder. One or more spokes 46 attached to the extendable body or its outer armor or to the cylinder end emanate from said pivot bearing to guide the extendable body in its motion. Another possibility is to attach guide rollers or sliding pieces 44 which are guided by guide rails or sliding planes 43 to the extendable cylinder. Guidance of the free end and of all sections of the extendable cylinder may also be brought about through a combination of the means just described. In any case, provision must be made, as indicated in FIG. 21 by the presence of the guide rails 43, for preventing the pivoted cylinder from being deflected from the pivotal plane by opposing forces acting on its movable end.

Figure 22:
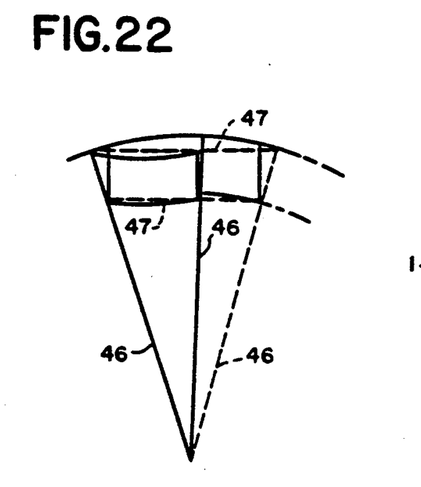
FIG. 22 an oppositely precurved extendable cylinder.

FIG. 22 points to the possibility of giving an extendable body 47 guided on spokes 46 a straight cylindrical form when it is fully extended. This is accomplished by attaching the extendable body 47 to the spokes in an oppositely precurved manner.

Figure 23:
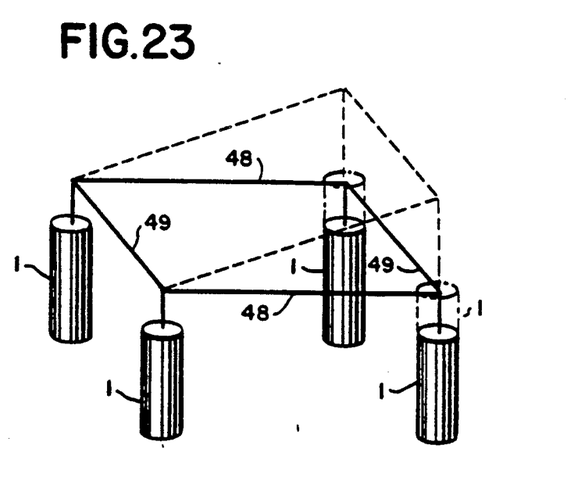
FIG. 23 a spatial manipulator.

A spatial manipulator is shown in FIG. 23. A plurality of extendable cylinders 1 bear, optionally unyieldingly, on the corners of a manipulating frame 48 and 49 and move it into the desired positions when filled to varying degrees.

LIST OF REFERENCE NUMERALS

1. Extendable cylinder, extendable accumulator
2. Extendable cylinder, extendable accumulator
3. Base plate
4. Interior
5. Intermediate armor 6. End cover
7. End cover
8. Pipe connection
9. End plate
10. Interior
11. Annular space
12. Pipe connection
13. Pipe connection
14. Lifting rod
15. Line, pressure line
16. Line, suction line
17. Support
18. Extendable length
19. Pivot
20. Swing bar
21. Stroke
22. Unextendable length
23. Pressure connection
24. Suction connection
25. Crossbar, column
26. Stroke
27. Stroke
28. Connecting plate
29. Port, connecting pipe
30. Coupling rod
31. Coupling lever, pivoted lever, drive lever
32. Equalizing line
33. Compression spring, helical spring
34. Base plate
35. Stop
36. Diaphragm
37. Plunger
38. Folding cylinder, corrugated cylinder
39. Rigid cylinder
40. Guide rail, guide cam
41. Guide member
42. Tensioning element
43. Guide rail
44. Guide roller, sliding piece
45. Pivot, pivot bearing, axis
46. Spoke
47. Extendable body, curved extendable cylinder
48. Connecting rod
49. Connecting rod
50. Tank
51. Sleeve bearing
52. Armor
53. Rubber thickness $t_G$, wall thickness of extendable cylinder
54. Bevel height, $h_i$
55. Width of flange T, widthof contact
56. Length of cross section $d_A$
57. Width of cross section $d_R$
58. Inside spacing $s_o$
59. Piston rod
60. Sealing cylinder, small-diameter extendable cylinder
61. Collar with sleeve bearing
62. Guide bushing
63. Flange thickness, thickness of rubber flange or clamping ring
64. Base plate
65. Center of surface area
66. Extendable cylinder, large-diameter; drive cylinder

What is claimed is:

1. A pumping device comprising, in combination:
   (a) an extendible cylinder having a cylindrical wall which is extendible in the axial direction and having means, embedded in said cylindrical wall, for reinforcing said extendible cylinder against radial expansion or contraction in response to an overpressure or underpressure, respectively, inside said extendible cylinder;
   (b) a first cover disposed at, and closing one end of said extendible cylinder;
   (c) a rigid pumping cylinder mounted on the end of said extendible cylinder which is opposite to said one end;
   (d) a piston disposed in said rigid cylinder and arranged to move slidably within said rigid cylinder;
   (e) a piston rod, extending through said extendible and rigid cylinders between said first cover and said piston;
   (f) a second cover disposed at, and closing the end of said rigid cylinder that faces away from said extendible cylinder, said second cover having at least one fluid opening to permit a fluid to enter the pumping space within said rigid cylinder between said piston and said second cover; and
   (g) flexible membrane connected across the coupled, facing ends of said extendible cylinder and said rigid cylinder, said membrane having a hole therethrough for the passage of said piston rod, said membrane being attached in a leakproof manner to said facing cylinder ends and said piston rod to prevent fluid from passing from one side thereof to the other.

2. The pumping device recited in claim 1, wherein said extendible cylinder and said rigid cylinder are coaxially arranged end to end.

3. The pumping device recited in claim 1, wherein said piston rod is rigidly attached to said first cover.

4. The pumping device recited in claim 1, wherein said first cover has an opening therethrough.

5. The pumping device recited in claim 4, wherein said opening in said first cover is arranged along the axis of said extendible cylinder.

6. The pumping device recited in claim 4, wherein said piston rod passes through said opening in said first cover in a leakproof manner.

7. The pumping device recited in claim 4, wherein said at least one fluid opening in said second cover comprises an inlet opening and a check valve permitting said fluid to flow only into said rigid cylinder; wherein said piston includes an opening therethrough from one side to the other and an outlet check valve permitting fluid to flow only in a direction out of said rigid cylinder; wherein said opening in said first cover serves as an outlet opening for the fluid; and further comprising a second extendible cylinder mounted on said first cover on the side opposite to said first extendible cylinder; a third cover mounted on the end of said second extendible cylinder opposite said first cover, said third cover also having an opening therethrough for removal of said fluid.

8. The pumping device recited in claim 7, further comprising support means connected between said third cover and the end of said first extendible cylinder which faces said rigid cylinder.

9. The pumping device recited in claim 8, further comprising mechanical drive means for moving said first cover.

10. The pumping device recited in claim 1, further comprising an inlet pipe and an outlet pipe respectively connected to said at least one fluid opening in said second cover, said inlet pipe and said outlet pipe including check valves to permit fluid to pass only in one direction therethrough.

11. The pumping device defined in claim 1, wherein said extendible cylinder and said rigid cylinder have substantially the same internal diameter.

12. The pumping device recited in claim 1, further comprising a pressure equalizing line connected to said rigid cylinder in the region of the end thereof facing said extendible cylinder.

13. The pumping device recited in claim 1, further comprising means for alternately filling and emptying the internal space of said extendible cylinder with a fluid, thereby to expand and contract said extendible cylinder.

14. The pumping device defined in claim 1, wherein the internal diameter of the said extendible cylinder is greater than that of said rigid cylinder.

* * * * *